United States Patent [19]

Reder et al.

[11] Patent Number: 4,761,575

[45] Date of Patent: Aug. 2, 1988

[54] SERVO-VALVE AND A CONTROL MOTOR THEREFOR

[75] Inventors: Herbert Reder, Lohr-Rodenbach; Hans-Georg Schubert, Partenstein, both of Fed. Rep. of Germany

[73] Assignee: Mannesmann Rexroth GmbH, Lohr, Fed. Rep. of Germany

[21] Appl. No.: 909,886

[22] Filed: Sep. 22, 1986

[30] Foreign Application Priority Data

Sep. 21, 1985 [DE] Fed. Rep. of Germany ....... 3533817

[51] Int. Cl.[4] .............................................. H02K 33/16

[52] U.S. Cl. ................................ 310/36; 137/625.62; 310/29; 335/244

[58] Field of Search ................................ 318/128–133; 310/29, 36–39, 183; 335/229, 230, 231, 243, 244, 246; 251/129.1; 137/625.62

[56] References Cited

U.S. PATENT DOCUMENTS

| | | | |
|---|---|---|---|
| 2,860,289 | 11/1958 | Verardo | 310/29 X |
| 3,156,857 | 11/1964 | Herr et al. | 318/132 |
| 3,323,090 | 5/1967 | O'Brien | 310/29 X |
| 4,065,096 | 12/1977 | Frantz et al. | 251/129.1 |
| 4,076,998 | 2/1978 | Montagu | 310/36 X |
| 4,090,112 | 5/1978 | Selverstone | 310/36 X |
| 4,262,877 | 4/1981 | Lang | 335/244 |

OTHER PUBLICATIONS

"The Hydraulic Trainer", Mannesmann Rexroth, Lohr (Main), W. Germany, 1981, p. 149.

*Primary Examiner*—Patrick R. Salce
*Assistant Examiner*—D. L. Rebsch
*Attorney, Agent, or Firm*—Cushman, Darby & Cushman

[57] ABSTRACT

A control motor for a servo-valve. Adjacent to the control coil of the control motor a dampening coil is located and short-circuited, so as to provide for an improvement of the frequency characteristic of the control motor.

11 Claims, 4 Drawing Sheets

SERVO-VALVE AND A CONTROL MOTOR THEREFOR

DESCRIPTION

1. Technical Field

This invention relates generally to a control motor for a servo-valve, and a servo-valve using such a control motor.

2. Background Art

Servo-valves are well-known and are primarily used to transform a small electrical input signal into a hydraulic output signal. Typically, a servo-valve comprises a control motor and a hydraulic amplifier. For details please see page 149 of "The Hydraulic Trainer" published by Mannesmann Rexroth, Lohr (Main), West-Germany, 1981.

Numerous types of control motors are known. One type of control motor comprises a plate-shaped horizontally arranged armature which is located with its two ends between the fields of permanent magnets. A resilient tube supports the armature and the oppositely located ends of the armature can be moved due to the magnetic field created by two control coils having the same magnetic polarity. As a consequence, the armature is slightly tilted, a movement which is transmitted by the armature to a flapper plate connected therewith. Said flapper plate, in turn, controls the hydraulic amplifier. A control motor of this type is shown in the book referred to above.

West-German laid open application OS No. 33 38 602 discloses a control motor of a type where the armature is of an elongate hollow cylindrical shape and is surrounded by a control coil located in the housing of the control motor. The flapper plate or output member of said motor which is connected to the armature, can act directly or indirectly onto a hydraulic component.

As is well known, the reciprocal movement of the bottom end of the flapper plate or rod occurs in accordance with the electric input signal supplied to the control coil. The electrical input signal, typically a control current, may show a different frequency depending on the task to be achieved with the control motor. As a consequence, the control motor as such will show a certain frequency-dependent behaviour.

Assuming that the control coil is supplied with a constant current of for instance 700 mA, then for the frequency $f=0$ the maximum or 100% displacement will be achieved. This means, the bottom end of the output member or flapper plate moves between its two extreme positions. The distance between the two extreme positions may be for instance 0.8 mm, i. e. the flapper plate moves from its zero or middle position 0.4 mm to the one extreme position and the same amount of 0.4 mm to the other extreme position. If the frequency of the input current signal increases, the displacement decreases compared with the maximum or 100% displacement. However, for a certain frequency, a frequency which will also depend on the hydraulic system which is actuated by the bottom end of the output member or flapper plate, an increase of displacement may occur up to displacement values which are above 100%. This means in absolute language, using the above example, that instead of the desired and admissible maximum value of displacement of 0.8 mm, a displacement of 1.5 mm occurs, a displacment which might cause stress or overload for the components of the control motor, specifically the resilient tube carrying the armature.

It is the primary object of the present invention to overcome the problems of the prior art.

Another object of the present invention is to provide an improved control motor for a servo-valve. A further object of the present invention is to provide a control motor having its resonance frequency dampened such that the components of the control motor are not subject to undesirably high forces.

DISCLOSURE OF THE INVENTION

In one aspect of the present invention a control motor for a servo-valve is provided with dampening means such that for a certain frequency an undesired and unpermissible increase of the displacement of the output element of the control motor is avoided.

In accordance with a preferred embodiment of the invention the dampening means are provided such that they affect the control coil of the control motor electrically.

According to another preferred embodiment of the invention the dampening means comprise electrical components which are placed in the electrical control circuit formed by the control coil. Preferrably, in said control circuit formed by the control spool inductors and/or capacitors are included.

In accordance with a particularly preferred embodiment of the invention the control coil means comprises a short circuited dampening coil which is located adjacent to main coil means, i. e. coil means into which the electrical input signal is fed.

In a situation where the control coil comprises said main coil and said dampening coil, the winding ratio of said two coils is selected such that the desired dampening effect is achieved for a certain frequency.

In a second aspect of the present invention a servo-valve is provided comprising a control motor having dampening means for avoiding an undesired increase of the displacement of the control member of the control motor.

BRIEF DESCRIPTION OF THE DRAWINGS

The above and other objects and advantages of the present invention will become apparent to those skilled in the art from the following description when read in conjunction with the accompanying drawings, wherein.

BEST MODE FOR CARRYING OUT THE INVENTION

Figure 1:
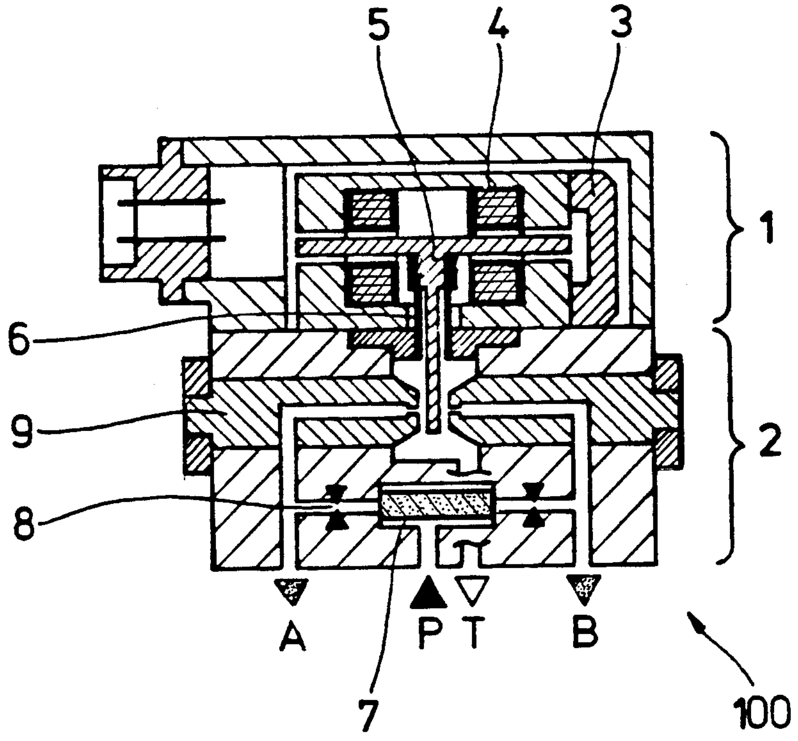
FIG. 1 (PRIOR ART)
FIG. 1 is a sectional view of a prior art single stage servo-valve comprising a control motor and a hydraulic amplifier.

Referring first to FIG. 1 a prior art single stage pressure servo-valve 100 is shown. Servo-valve 100 comprises an electrical control motor (torque motor) 1 and a hydraulic amplifier 2. The control motor 1 comprises a permanent magnet 3, control coils 4 and an armature 5 having a flapper plate. The control motor 1 transforms a small control current into a proportional movement of the flapper plate. The armature and the flapper plate form a single member which is mounted to a resilient thin-walled tube 6. Tube 6 simultaneously seals the control motor 1 with respect to the hydraulic portion of the servo-valve. The control current or current signal is adapted to engergize the control coils and causes a deflection of the armature 5 against the spring force of the tube 6. The direction of deflection depends on the polarity of the control current. The torque or moment acting on the tube, and thus the deflection of the flapper plate, is proportional to the control current. When the control current is shut off, the tube 6 brings the armature 5 and thus also the flapper plate back into center position. The deflection of the flapper plate is transformed into a hydraulic value in the hydraulic amplifier 2. In FIG. 1 a jet flapper plate system is used as hydraulic amplifier 2. The drawing shows that the pilot oil is supplied from a port P via a small protection filter 7 and continues on to the fixed nozzles or jets 8 and the controllable nozzels or jets 9.

Figure 2:
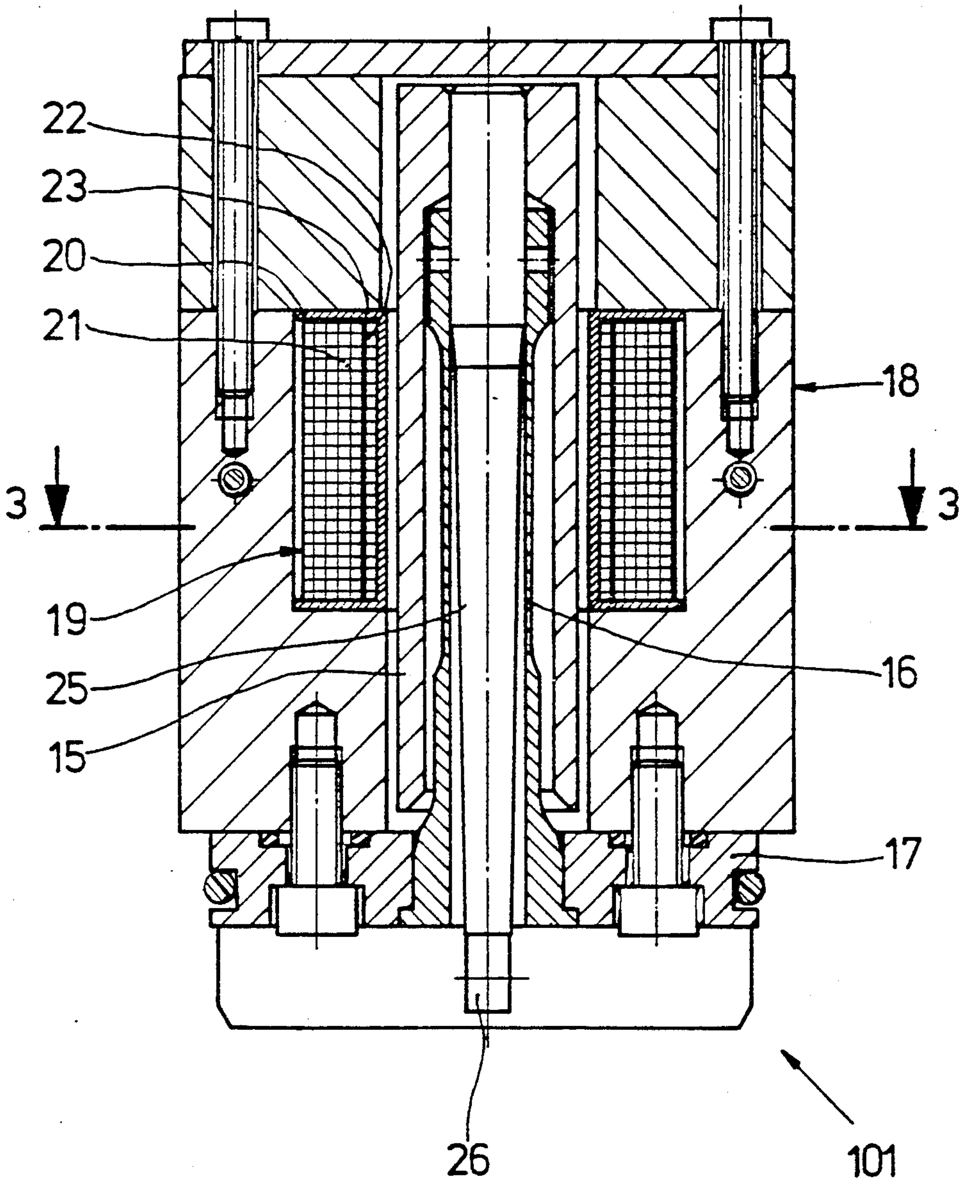
FIG. 2 is a sectional view of a control motor of a generally known design, however, being provided with a control coil of the invention.

FIG. 2 discloses a sectional view of a different embodiment of an electrical control motor referred to by reference numeral 101. This type of electrical control motor 101 is described in detail in West-German laid open application OS No. 3338 602. Control motor 101 comprises in substance an armature 15 mounted on a resilient tube 16. The resilient tube 16 is mounted in a socket 17. The armature 15 can move under the influence of a control coil 19 and under the influence of permanent magnet means which are also present. The movements of the armature 15 are transmitted to an output member (rod) 25. The lower free end 26 of the rod 25 can carry out a reciprocal movement with respect to its central position. The bottom end 26 can act directly onto a hydraulic component, or cooperates with nozzles as is shown for the control motor 1 of FIG. 1. In accordance with the present invention the control coil 19 located in a housing 18 of the control motor 101 is of a design yet to be described.

The present invention is directed to an improvement of the operation of the electric control motor, in particular for a servo-valve.

Even though the invention can be used also in connection with a control motor of FIG. 1, the invention will be described in connection with the control motor design of FIG. 2, a design for which the invention is particularly advantageous.

In accordance with the present invention the electric control motor 101 is provided with dampening means such that a trouble-free operation of the control motor can be achieved across a large frequency range. Specifically, the invention provides for dampening means for the control coil (control coil means) 19. Preferrably, the dampening means are provided in the form of a dampening coil 22 which is located adjacent to a main coil 21. The dampening coil 22 is preferrably a short circuit coil, i. e. the two ends of the dampening coil 22 are connected with each other. For example, the two ends are soldered to each other.

In accordance with the invention the control coil 19 comprises a first or main coil 21 and a second or dampening coil 22. Main coil 21 and dampening coil 22 are wound on a single coil body 20 as is shown schematically in detail in FIGS. 3 and 4.

Figure 3:
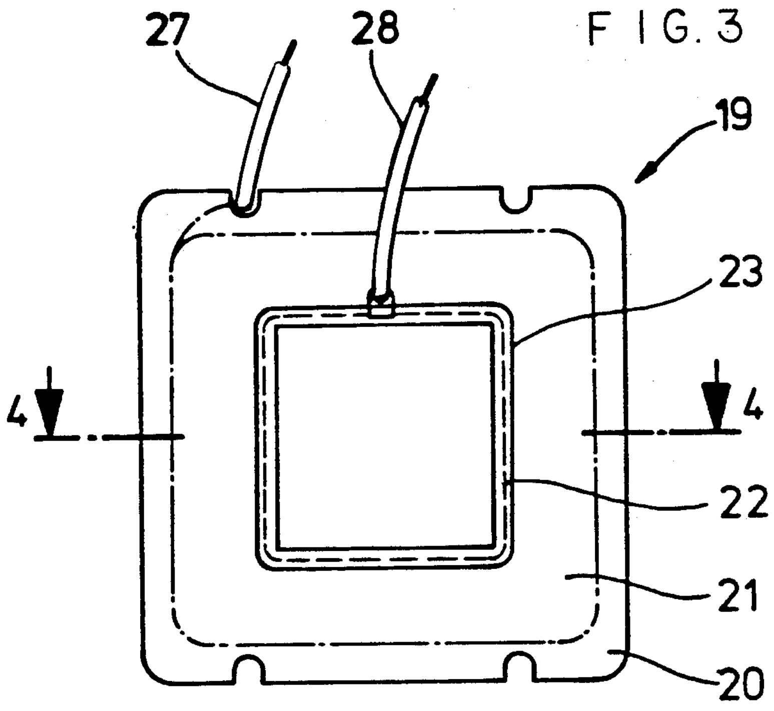
FIG. 3 is a schematic sectional view along line 3—3 in FIG. 2 showing only the control coil of the invention.
Figure 4:
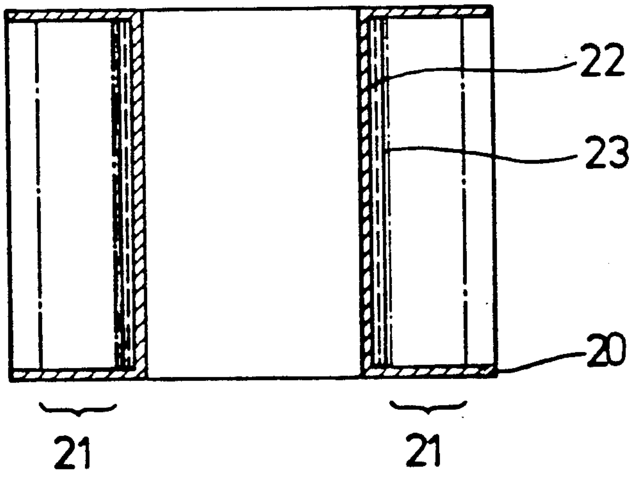
FIG. 4 is a schematic sectional view along line 4—4 in FIG. 3.

As is shown in FIGS. 3 and 4 first the dampening coil 22 is wound onto the coil body 20, which is substantially square-shaped in cross section. For instance, dampening coil 22 comprises forty windings and the two ends of the dampening coil are soldered to each other. Onto the dampening coil 22 the main coil 21 is wound and comprises, for instance, 600 windings. The resistance of the main coil is, for instance, 9 ohms. The control current for the main coil 21 is, for example, 700 mA. A source of a constant current is used but not shown to supply the main coil 21 with current. Between the dampening coil 22 and the main coil 21 a layer of an insulating film 23 is provided. The insulating film of coil 23 comprises preferrably polytetrafluorethylene. The ends 27 and 28 of the main coil 21 extend out of the coil body 20 as is shown in FIG. 3 and are adpated for being connected with the already mentioned source of constant current forming a control circuit.

In the shown embodiment the dampening coil 22 is located immediately adjacent to the main coil 21 within the coil body 20. Generally, the short-circuited dampening coil 22 has to be located in the area of the magnetic field of the main coil 21. Preferrably, the dampening coil 22 is located (as is shown) within the main coil 21. However, it should be noted that it would also be possible to wind the dampening coil 22 onto the main coil 21. Moreover, the dampening coil 22 could be wound onto the outside of the armature 15, preferrably in the area of the main coil 21.

Figure 5:
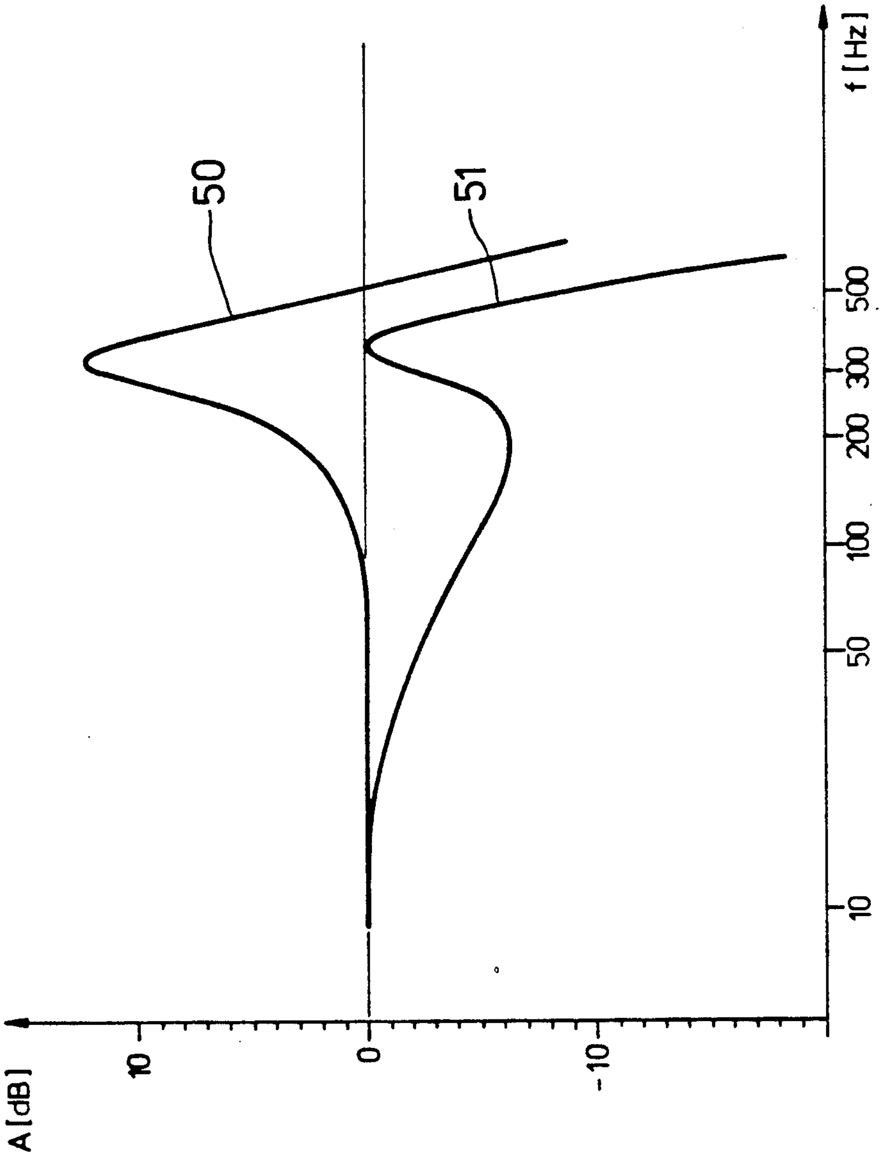
FIG. 5 is a graphic representation of the frequency characteristic of a control motor of FIG. 2 with and without the dampening means of the invention.

FIG. 5 shows a so-called Bode-diagram. This graphic representation will be used to explain the operation of the dampening means of the invention, dampening means which have the form of the dampening coil 22 in the embodiment disclosed.

Curve 50 shows the frequency characteristic of a control motor 100 of FIG. 2 without the dampening coil 22.

In general, FIG. 5 discloses how the displacement of the bottom end 26 of the rod 25 depends on the frequency which is represented on the abscissa in a logarithmic scale. Generally, for the Bod-diamgram the following is established:

$$A\ dB = 20.\log X_q/X_e$$

A=amplitude or displacement characteristic
$X_a$=output signal (%)
$X_e$=input signal (%)

Specifically referring to curve 50 of FIG. 5 it can be seen that in certain frequency area, i. e. in the area of approximately 300 herz, a significant increase in amplitude occurs. Such an increase is undesirable, because a heavyload is put on the resilient tube 16, which might be stressed too much, so that the control motor 101 breaks. By using the dampening means of the invention the frequency characteristic will follow curve 51, a characteristic which provides significantly improved results.

The basic concept of the present invention is to remove the area of increase above the admissible value. In accordance with the embodiment shown this is done by dampening means which preferrably are in the form of a dampening coil 22. Generally, it is also possible to use, instead of the dampening coil 22, other frequency depending components for dampening the main coil 21. For instance, besides inductors, capacitors may also be used.

The invention was described in connection with a control motor 101 of the type of FIG. 2, inasmuch as the invention is particularly advantageous for this type of control motor. The invention can be put to work very cost-effectively.

While the present invention has been described with respect to specific embodiments, it is to be understood that numerous changes and modifications may be made in the circuits and arrangements of the elements therein without departing from the spirit and scope of the present invention as defined in the appended claims.

We claim:

1. An electric control motor for a servo valve, said motor comprising:

a housing, an armature movably mounted in said housing to actuate an output member (26), permanent magnet means located in said housing adjacent to said armature, control coil means (19) located in said housing adjacent to said armature and adapted to be energized by a control signal, dampening means in the form of at least one dampening coil (22), the two ends of said at least one dampening coil (22) being connected with each other, said dampening means providing a dampening effect depending on the frequency such that the movement of the free end of the output member (26) does not exceed a predetermined maximum displacement, said one dampening coil (22) being inductively coupled to said control coil means (19).

2. The control motor of claim 1 wherein the number of windings of the dampening coil is significantly lower than the number of windings of the control coil.

3. The control motor of claim 1, said control coil means comprise a single control coil which is indirectly coupled to a single dampening coil.

4. The control motor of claim 3 wherein the dampening coil is located within said control coil.

5. The control motor of claim 3 wherein said dampening coil is located on the control coil.

6. The control motor of claim 3 wherein the dampening coil is located on the armature adjacent to the control coil.

7. The control motor of claim 4 wherein the dampening coil is wound onto the core of a coil body and is covered by an insulating film, onto which the control coil is wound.

8. The control motor of claim 1 wherein said dampening means are formed by a capacitance.

9. A control motor for a servo-valve, said control motor comprising; a housing, an armature extending in said housing, an armature supporting tube surrounded by said armature, an output member connected to said armature and adapted to follow the movements of said armature, permanent magnet means for subjecting said armature to a magnetic field, coil means in said housing adapted to subject said armature to a magnetic field depending on the energization of said coil means, and dampening coil means located in the vicinity of said armature to improve the frequency response of the output member.

10. The control motor of claim 9 wherein said coil means comprises a single coil and wherein said dampening coil means is a single coil located on the same support structure as the other coil.

11. A servo-valve comprising a control motor and a hydraulic amplifier wherein said control motor comprises housing defining a center bore means to receive an armature, a resilient tube coaxially extending within said armature rod-like output means coaxially extending within said tube, coil means coaxially surrounding said armature adjacent to permanent magnet means, said coil means causing a movement of said armature when supplied with a control current, and dampening coil means adjacent to said control coil means, said dampening coil means having its coil ends connected to each other.

* * * * *